United States Patent
Yokose (10) Patent No.: US 8,189,936 B2
(45) Date of Patent: May 29, 2012

(54) IMAGE PROCESSING APPARATUS AND COMPUTER READABLE MEDIUM STORING PROGRAM TO ENCODE DATA BLOCKS BASED ON FEATURE INDICES

(75) Inventor: Taro Yokose, Ashigarakami-Gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1103 days.

(21) Appl. No.: 12/076,622

(22) Filed: Mar. 20, 2008

(65) Prior Publication Data

US 2009/0028454 A1  Jan. 29, 2009

(30) Foreign Application Priority Data

Jul. 24, 2007  (JP) .................................. 2007-191571

(51) Int. Cl.
*G06K 9/36*  (2006.01)
(52) U.S. Cl. .................... 382/251; 382/245; 375/240.03; 348/405.1
(58) Field of Classification Search .................. 382/232, 382/245, 251; 375/240.03; 348/405.1
See application file for complete search history.

(56) References Cited

U.S. PATENT DOCUMENTS

| | | | | |
|---|---|---|---|---|
| 5,317,396 A | * | 5/1994 | Fujinami | 348/390.1 |
| 5,337,087 A | * | 8/1994 | Mishima | 375/240.04 |
| 5,724,452 A | * | 3/1998 | Ohara | 382/251 |
| 6,266,375 B1 | * | 7/2001 | Chang et al. | 375/240.03 |
| 6,738,423 B1 | * | 5/2004 | Lainema et al. | 375/240.03 |
| 6,982,762 B1 | * | 1/2006 | Hui | 348/405.1 |
| 2006/0188015 A1 | | 8/2006 | Kondo et al. | |

FOREIGN PATENT DOCUMENTS

| | | | |
|---|---|---|---|
| JP | 02105792 | * | 4/1990 |
| JP | A-2003-338935 | | 11/2003 |
| JP | A-2006-174331 | | 6/2006 |
| JP | A-2006-229458 | | 8/2006 |

OTHER PUBLICATIONS

Notification of Reasons for Refusal for priority Japanese Patent Application No. 2007-191571, mailed on Feb. 24, 2011 (w/ English translation).

* cited by examiner

*Primary Examiner* — Matthew Bella
*Assistant Examiner* — Eueng-Nan Yeh
(74) *Attorney, Agent, or Firm* — Oliff & Berridge, PLC (57) ABSTRACT

An image processing apparatus includes a criteria setter that sets selection criteria for selecting quantization intensities on the basis of feature indices of an inputted image; an intensity selector that selects, on the basis of the selection criteria set by the criteria setter, one of plural quantization intensities for each partial image area of the inputted image; and a quantizer that quantizes image information on each partial image area with the quantization intensity selected by the intensity selector.

8 Claims, 8 Drawing Sheets

IMAGE PROCESSING PROGRAM 52

ESTIMATION FORMULA FOR TOTAL QUANTITY OF CODES (TOTAL QUANTITY OF CODES ESTIMATED)
= $\Sigma_L\{$(NUMBER OF BLOCKS TO BE PROCESSED WITH $Q_L$) $\times$ $C_L\}$

FIG. 3B

RELATIONSHIP BETWEEN QUANTITY OF CODES AND NUMBER OF BLOCKS (DESIRED QUANTITY OF CODES)
= (NO. OF $Q_0$ BLOCKS $\times$ $C_0$) + (NO. OF $Q_1$ BLOCKS $\times$ $C_1$)
= (NO. OF $Q_0$ BLOCKS $\times$ ($C_0$ - $C_1$)) + TOTAL NO. OF BLOCKS $\times$ $C_1$

FIG. 3C

DISTRIBUTION OF FEATURE INDICES

IMAGE PROCESSING APPARATUS AND COMPUTER READABLE MEDIUM STORING PROGRAM TO ENCODE DATA BLOCKS BASED ON FEATURE INDICES

CROSS-REFERENCE TO RELATED APPLICATIONS

This application is based on and claims priority under 35 USC 119 from Japanese Patent Application No. 2007-191571 filed Jul. 24, 2007.

BACKGROUND

Technical Field

The present invention relates to an image processing apparatus and a computer readable medium storing a program.

SUMMARY

According to an aspect of the invention, there is provided an image processing apparatus including a criteria setter that sets selection criteria for selecting a quantization intensity on the basis of feature indices of an inputted image; an intensity selector that selects, on the basis of the selection criteria set by the criteria setter, one of plural quantization intensities for each partial image area of the inputted image; and a quantizer that quantizes image information on each partial image area with the quantization intensity selected by the intensity selector.

BRIEF DESCRIPTION OF THE DRAWINGS

Exemplary embodiments of the present invention will be described in detail based on the following figures, wherein.

DETAILED DESCRIPTION

Figure 1:
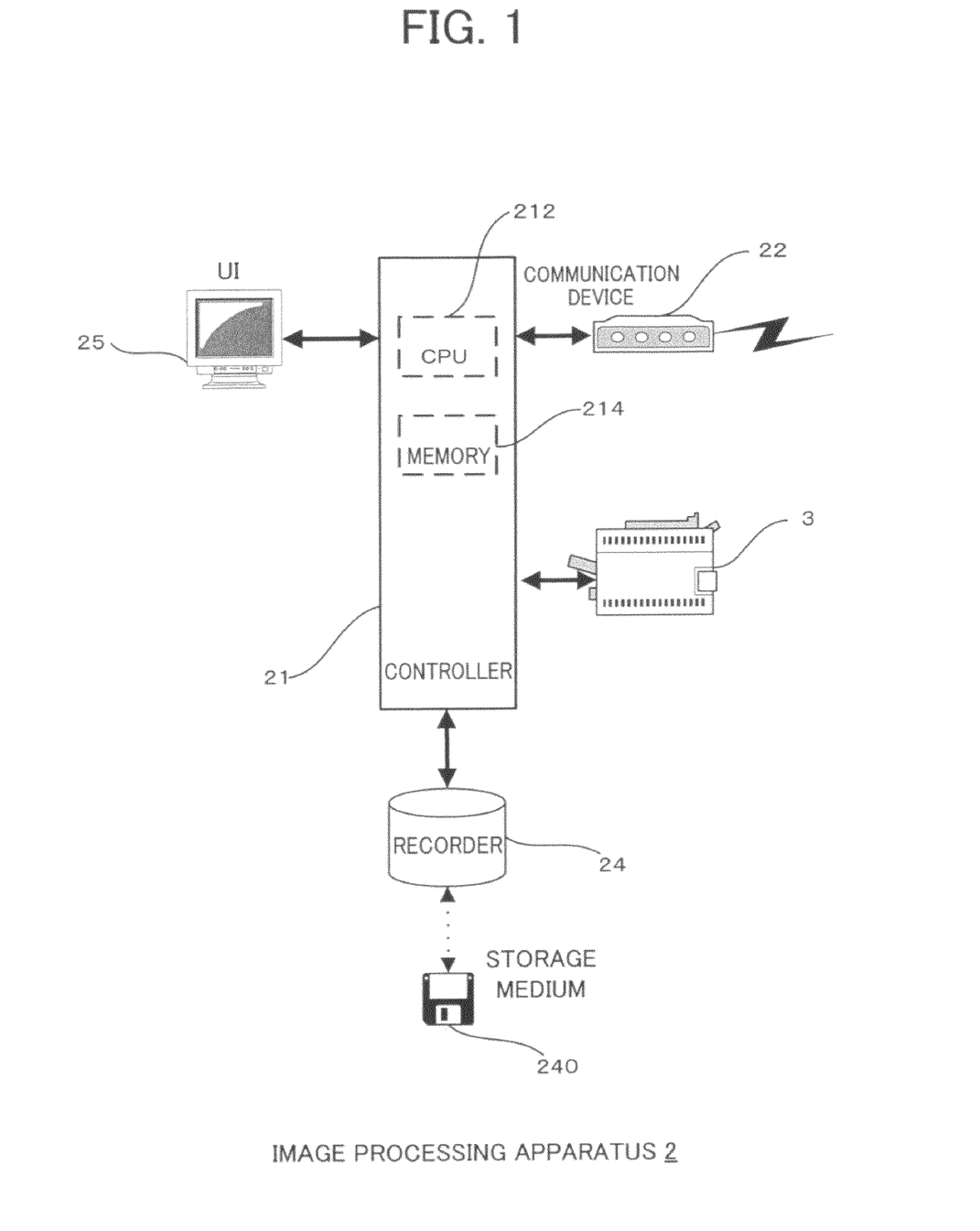
FIG. 1 shows the hardware configuration of an image processing apparatus 2 with focus on a controller 21.

FIG. 1 shows the hardware configuration of an image processing apparatus 2 with focus on a controller 21.

As shown in FIG. 1, the image processing apparatus 2 includes the controller 21 having a CPU 212 and a memory 214, a communication device 22, a recorder 24 such as an HDD or CD device, and a user interface (UI) 25 having an LCD display or a CRT display and a keyboard or a touch panel.

The image processing apparatus 2, which is a general purpose computer in which, for instance, an image processing program 5 (to be described afterwards) is installed, acquires image data via the communication device 22, the recorder 24 or the like, encodes the acquired image data and transmits the encoded data to a printer 3.

Figure 2:
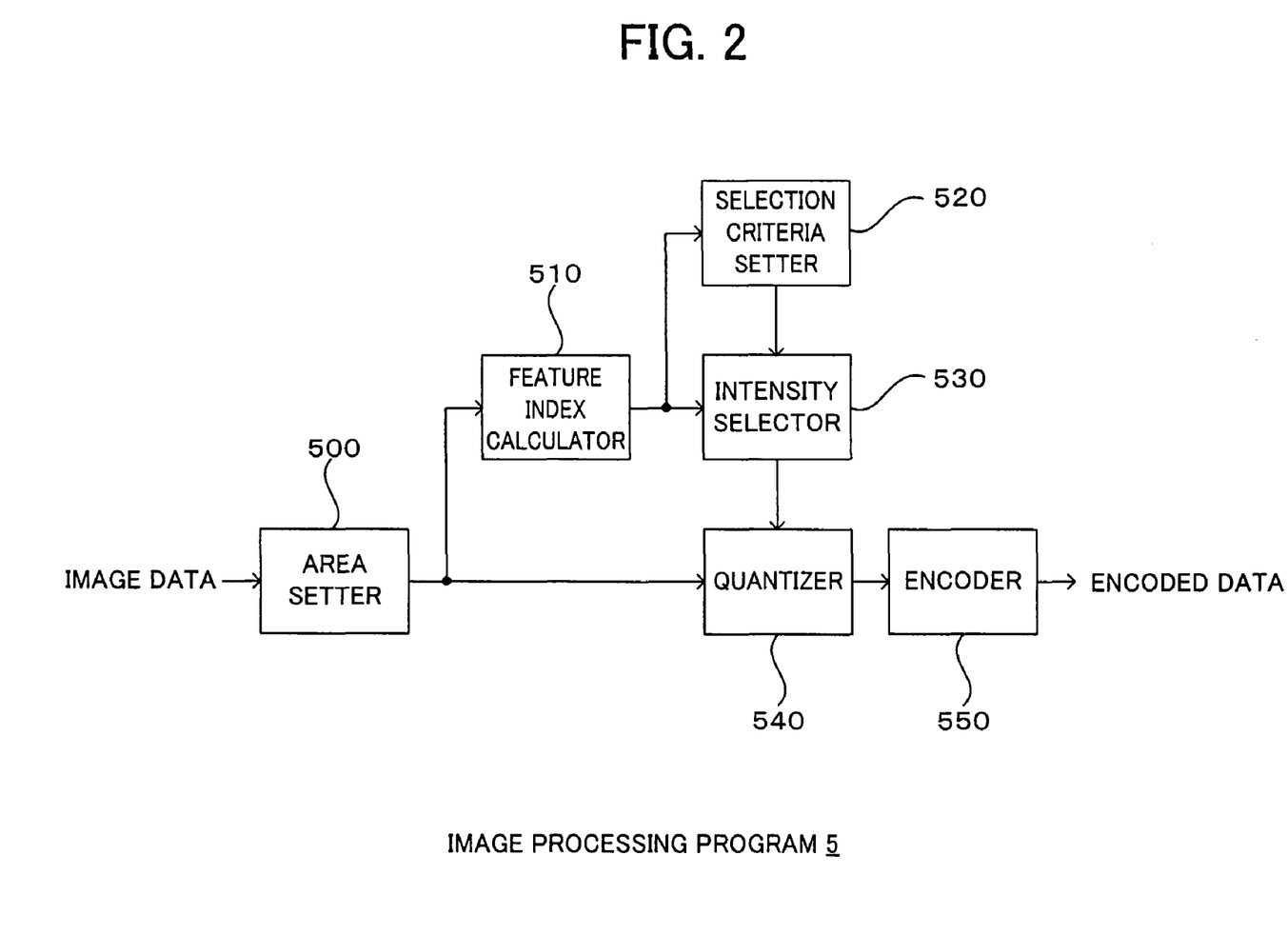
FIG. 2 shows an example of functional configuration of an image processing program 5 executed by the controller 21 (FIG. 1).

FIG. 2 shows an example of functional configuration of the image processing program 5 executed by the controller 21 (FIG. 1).

As shown in FIG. 2, the image processing program 5 has an area setter 500, feature index calculator 510, a selection criteria setter 520, an intensity selector 530, a quantizer 540, and an encoder 550. The functions of the quantizer 540 and of the encoder 550 may as well be integrated.

In the image processing program 5, the area setter 500 acquires rasterized image data via the communication device 22, the recorder 24 or the like, and sets a partial image area (hereinafter referred to as block) of a predetermined size for the acquired image data.

The area setter 500 in this example sets rectangular areas of a predetermined size for the sets of acquired image data as blocks in the order of scanning, and outputs the pixel value of each block to the feature index calculator 510 and the quantizer 540.

The feature index calculator 510 calculates the feature indices of each block set by the area setter 500, and outputs the calculated feature indices to the selection criteria setter 520 and the intensity selector 530. The feature indices so calculated are values representing the features of image information in each block, including for instance the frequency component, a histogram of pixel values, the dynamic range (the span between the highest pixel value and the lowest pixel value in the block), the number of colors (the number of tones) the entropy and the dispersion.

The feature index calculator 510 in this example calculates for each block the difference between the highest pixel value and the lowest pixel value in the block (namely the dynamic range), and outputs the calculated dynamic range to the selection criteria setter 520 and the intensity selector 530.

The selection criteria setter 520 sets selection criteria for selecting quantization intensities on the basis of the feature indices of the inputted image. For instance, the selection criteria setter 520, holding the feature indices of each block inputted from the feature index calculator 510, identifies the distribution of feature indices, and sets selection criteria on the basis of the identified distribution and the desired quantity of codes.

The selection criteria setter 520 in this example holds the dynamic range of each block (the range of differentiated tones contained in each block) inputted from the feature index calculator 510, calculates selection criteria on the basis of the distribution of the dynamic range over the whole inputted image and the target quantity of codes, and outputs the calculated selection criteria to the intensity selector 530.

The intensity selector 530 selects the quantization intensity to be applied to each block on the basis of the selection criteria set by the selection criteria setter 520 and the feature indices of each block calculated by the feature index calculator 510.

The intensity selector 530 in this example selects 2 as the upper limit of the number of tones for a noted block if the dynamic range of the noted block is not narrower than the selection criterion or 1 as the upper limit of the number of tones if the dynamic range is narrower than the selection criterion.

The quantizer 540 quantizes the image information of each block with the quantization intensity selected by the intensity selector 530, and outputs the quantized image information to the encoder 550. Available ways of quantizing image information include not only simple linear quantization but also nonlinear quantization, resolution conversion, vector quantization, N level quantization (block truncation coding) and quantization using frequency conversion (JPEG).

When 2 is selected by the intensity selector 530 as the upper limit of the number of tones for the noted block, the quantizer 540 in this example classifies, with the average of the maximum and minimum in the noted block as the threshold, the pixel values in the block into a group of pixel values not below the threshold and a group of those below the threshold, and covers the pixels in each group all over with the average pixel value in the group. When 1 is selected by the intensity selector 530 as the upper limit of the number of tones for the noted block, the quantizer 540 in this example covers all the pixels in the noted block with the average pixel value in this block. Thus, the quantizer 540 in this example quantizes the pixel values of each block by N level quantization.

The encoder 550 encodes the image information inputted from the quantizer 540. Since N level quantization is accomplished by the quantizer 540 in this example, the encoder 550 here may use an encoding method harmonious with processing for a limited variety of colors (e.g. the run length encoding method or the LZ encoding method).

Figure 3A:
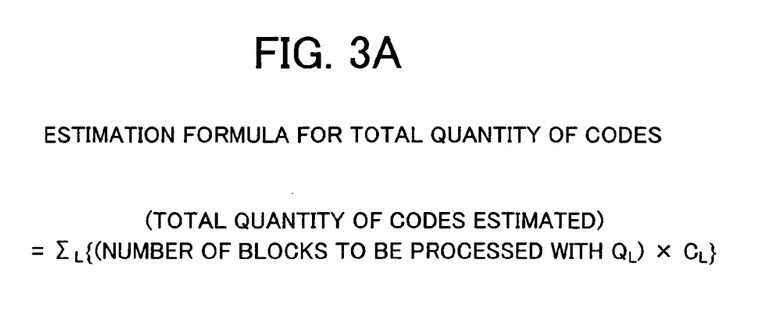
FIGS. 3A to 3C illustrate a method of setting selection criteria.
Figure 3B:
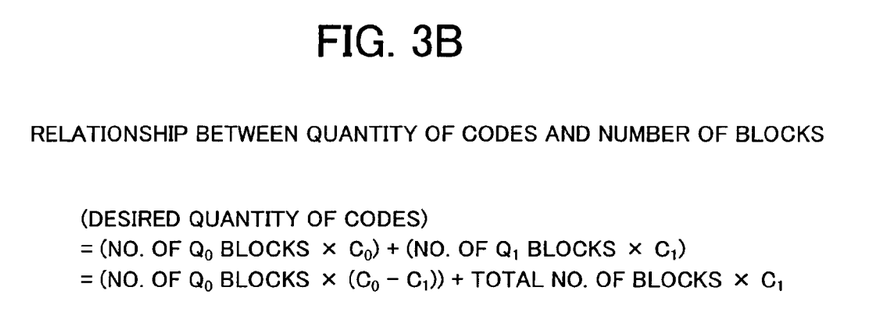
Figure 3C:
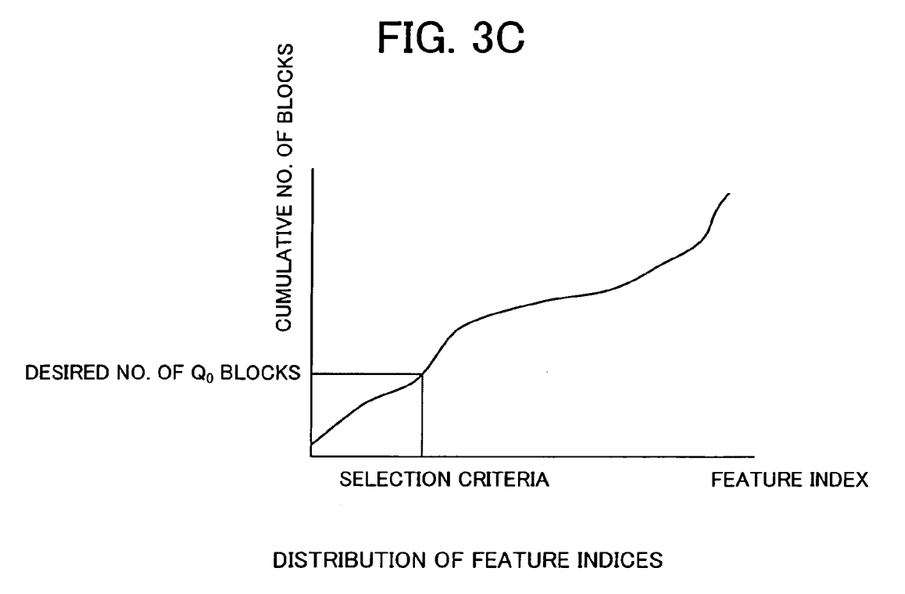

FIGS. 3A to 3C illustrate a method of setting selection criteria.

When plural quantization intensities are available as stated above, the number of blocks to which each quantization intensity is applied greatly affects the quantity of codes. The intensity of quantization represents the accuracy of encoding. Generally, the weaker the quantization is, the greater the quantity of codes is. Whereas a certain quantity of codes can be expected on the average for a given level of quantization intensity, this quantity of codes differs with the quantization intensity. For instance, where a quantity of codes CL can be expected for a quantization intensity QL, the total quantity of codes can be estimated from the estimation formula of FIG. 3A.

If CL is constant and known here, figuring out the number blocks to be processed with QL will enable the quantity of codes to be estimated.

Since quantization is controlled according to the feature index in this exemplary embodiment, if the distribution of numbers of blocks for each feature index, the total quantity of codes can be estimated as shown in FIG. 3B. Conversely, as shown in FIG. 3C, also the selection criteria for obtaining the desired quantity of codes (the target quantity of codes) can be figured out.

Figure 4:
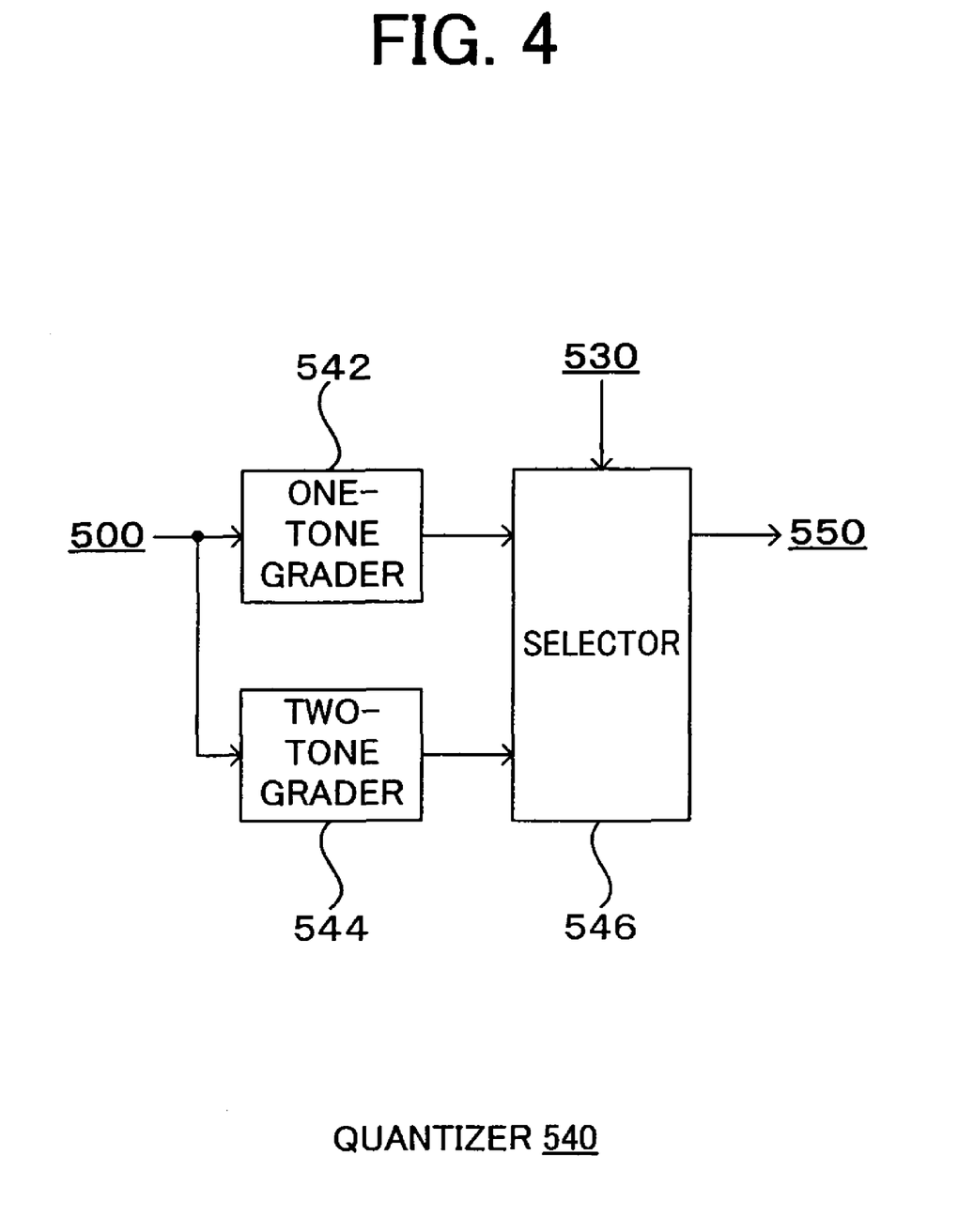
FIG. 4 illustrates a quantizer 540 (FIG. 2) in more detail.

FIG. 4 illustrates the quantizer 540 (FIG. 2) in further detail.

As illustrated in FIG. 4, the quantizer 540 has a one-tone grader 542, a two-tone grader 544 and a selector 546.

The one-tone grader 542 converts the image information on each block inputted from the area setter 500 (FIG. 2) into image information expressed in one tone. More specifically, the one-tone grader 542 replaces every pixel value in each block with the average pixel value in the block.

The two-tone grader 544 identifies the maximum and the minimum out of each block inputted from the area setter 500, classifies the pixel values in the blocks, with the average of the identified maximum and minimum as the threshold, into a group of pixel values not below the threshold and a group of those below the threshold, and covers all the pixels in the noted block with the average pixel value in each group.

The selector 546 outputs the image information inputted from the one-tone grader 542 to the encoder 550 (FIG. 2) for the blocks for which 1 has been selected by the intensity selector 530 (FIG. 2) as the upper limit of the number of tones, and outputs the image information inputted from the two-tone grader 544 to the encoder 550 for the blocks for which 2 has been selected by the intensity selector 530 as the upper limit of the number of tones.

Figure 5:
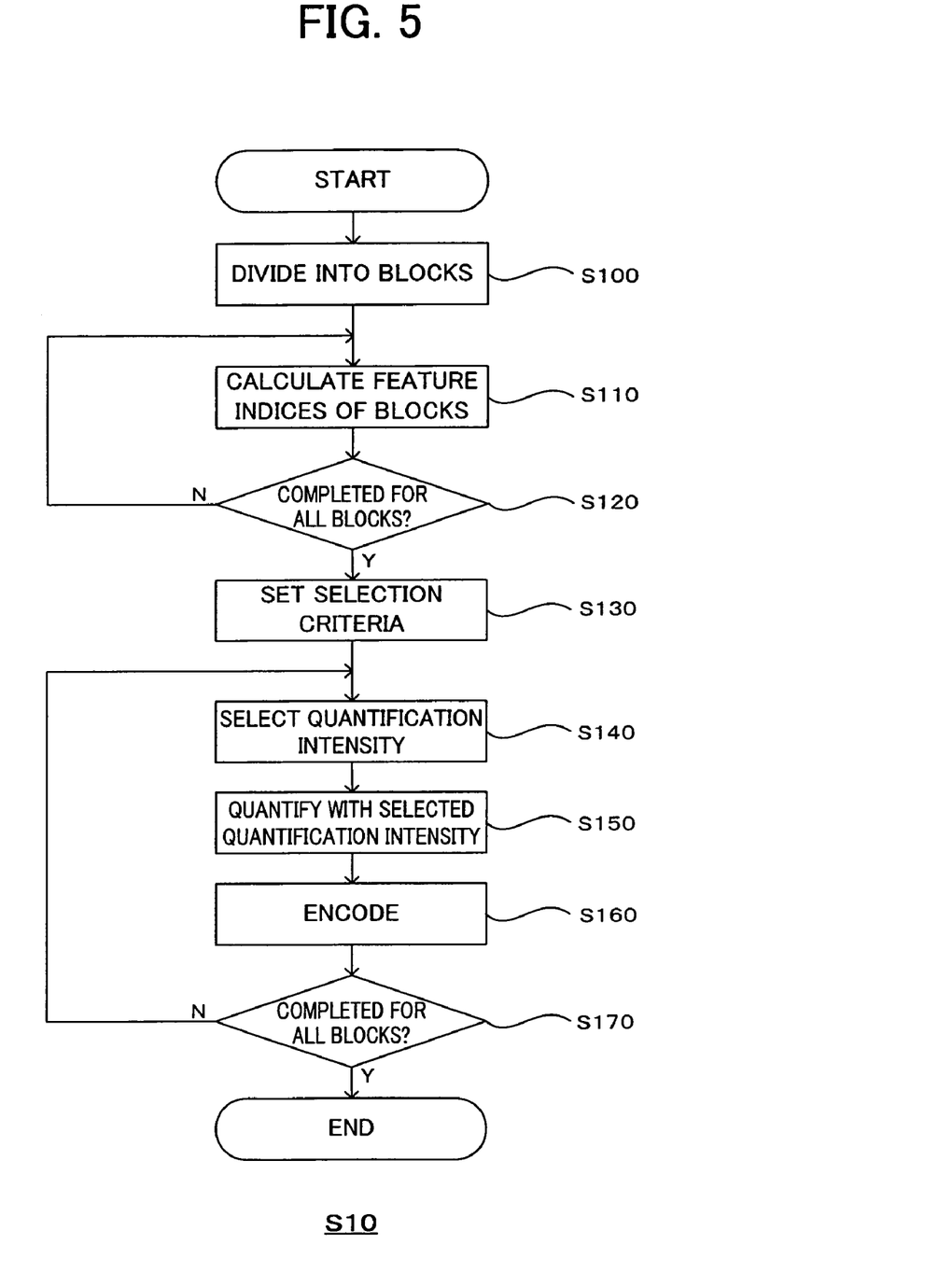
FIG. 5 is a flow chart of an operation (S10) of the image processing program 5.

FIG. 5 is a flow chart of an operation (S10) of the image processing program 5.

As charted in FIG. 5, the area setter 500 at step 100 (S100), when image data is inputted, sets a block of a predetermined size for the inputted image.

At step 110 (S110), the feature index calculator 510 calculates the feature indices (dynamic ranges) of blocks successively set by the area setter 500, and outputs the calculated feature indices of the blocks to the selection criteria setter 520 and the intensity selector 530. The selection criteria setter 520 and the intensity selector 530 successively hold the feature indices inputted from the feature index calculator 510.

At step 120 (S120), the image processing program 5 determines whether or not feature indices have been calculated for all the blocks and, if there is any unprocessed block, returns to the processing at S110 or, if there is no unprocessed block, proceeds to processing at S130.

At step 130 (S130), the selection criteria setter 520 calculates selection criteria on the basis of the distribution of feature indices calculated by the feature index calculator 510 and the target quantity of codes, and outputs the calculated selection criteria to the intensity selector 530.

At step 140 (S140), the intensity selector 530 compares the feature index (dynamic range) of the noted block with the selection criterion inputted from the selection criteria setter 520, selects 2 as the upper limit of the number of tones if the dynamic range is not below the selection criterion or selects 1 as the upper limit of the number of tones if the dynamic range is below the selection criterion, and notifies the quantizer 540 of the selected upper limit of the number of tones.

At step 150 (S150), the quantizer 540 quantizes the image information on the noted block on the basis of the upper limit of the number of tones selected by the intensity selector 530.

At step 160 (S160), the encoder 550 encodes the image information on the noted block quantized by the quantizer 540.

At step 170 (S170), the image processing program 5 determines whether or not all the blocks have gone through encoding and, if there is any unprocessed block, returns to processing at S140 to process the next noted block or, if there is no unprocessed block, outputs encoded data to the outside to end the processing of S10.

As described above, the image processing apparatus 2 of this exemplary embodiment sets the selection criterion of quantization intensity on the basis of the feature indices of inputted images, and sets the quantization intensity for each block on the basis of the set selection criterion. Since the selection criterion is set on the basis of the target quantity of codes, reduction in the redoing of encoding can be expected.

[Modification 1]

Next, a modification of the above-described exemplary embodiment will be described.

Whereas the estimation formula of FIG. 3A is presupposed in determining the selection criteria for quantization intensity in the foregoing exemplary embodiment, CL in the estimation formula actually varies with the particulars of the image. This may prevent the desired quantity of codes from being obtained.

In view of this problem, a first modification is configured so as to feed back the result of encoding to the selection criteria setter 520.

Figure 6:
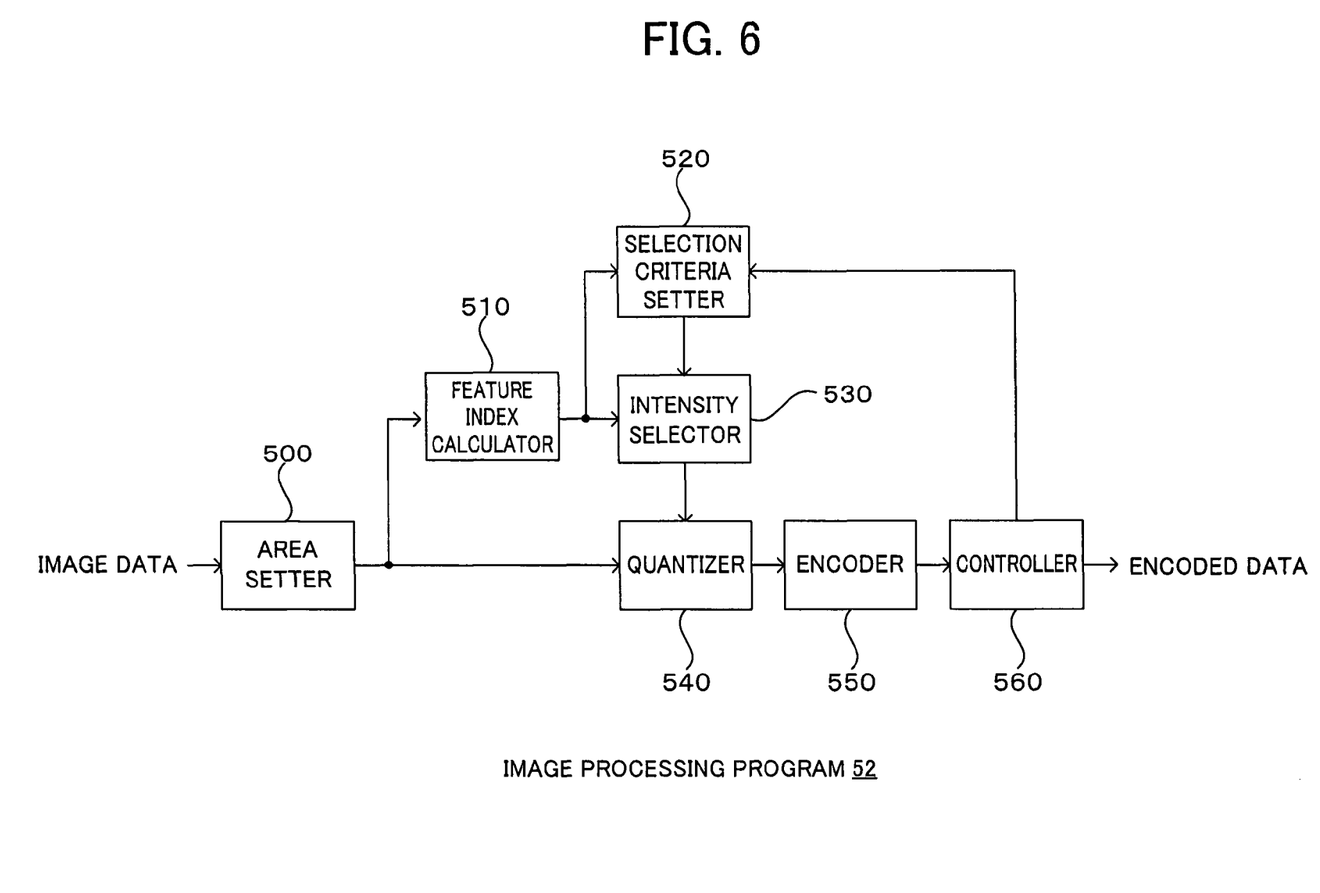
FIG. 6 shows an example of functional configuration of a second image processing program 52.

FIG. 6 shows an example of functional configuration of a second image processing program 52. In the illustration of the functional configuration herein, substantially the same constituent elements as their counterparts in FIG. 2 are assigned respectively the same reference signs.

As shown in FIG. 6, the image processing program 52 in this modification has a configuration in which a controller 560 is added to the image processing program 5 of FIG. 2.

The controller 560 determines whether encoded data inputted from the encoder 550 does not surpass the target quantity of codes and, if it is more than the target quantity of codes, feeds that finding back to the selection criteria setter 520 to instruct another constituent element to re-quantize the inputted image data. For instance, the controller 560 calculates an actually measured value CL' on the basis of encoded data inputted from the encoder 550, and feeds back the calculated CL' to the selection criteria setter 520. In this case, the selection criteria setter 520 resets the selection criterion on the basis of CL' fed back from the controller 560, and the intensity selector 530 and the quantizer 540 re-quantizes the inputted image information on the basis of the reset selection criterion.

The controller 560 may as well instruct the selection criteria setter 520 to reset the selection criterion by multiplying the right side of the estimation formula of FIG. 3A by (the quantity of codes at the time of trial)/(the estimated quantity at the time of trial). Or the controller 560 may calculate the number of blocks of each quantization intensity level by complementing the result of trial.

Figure 7:
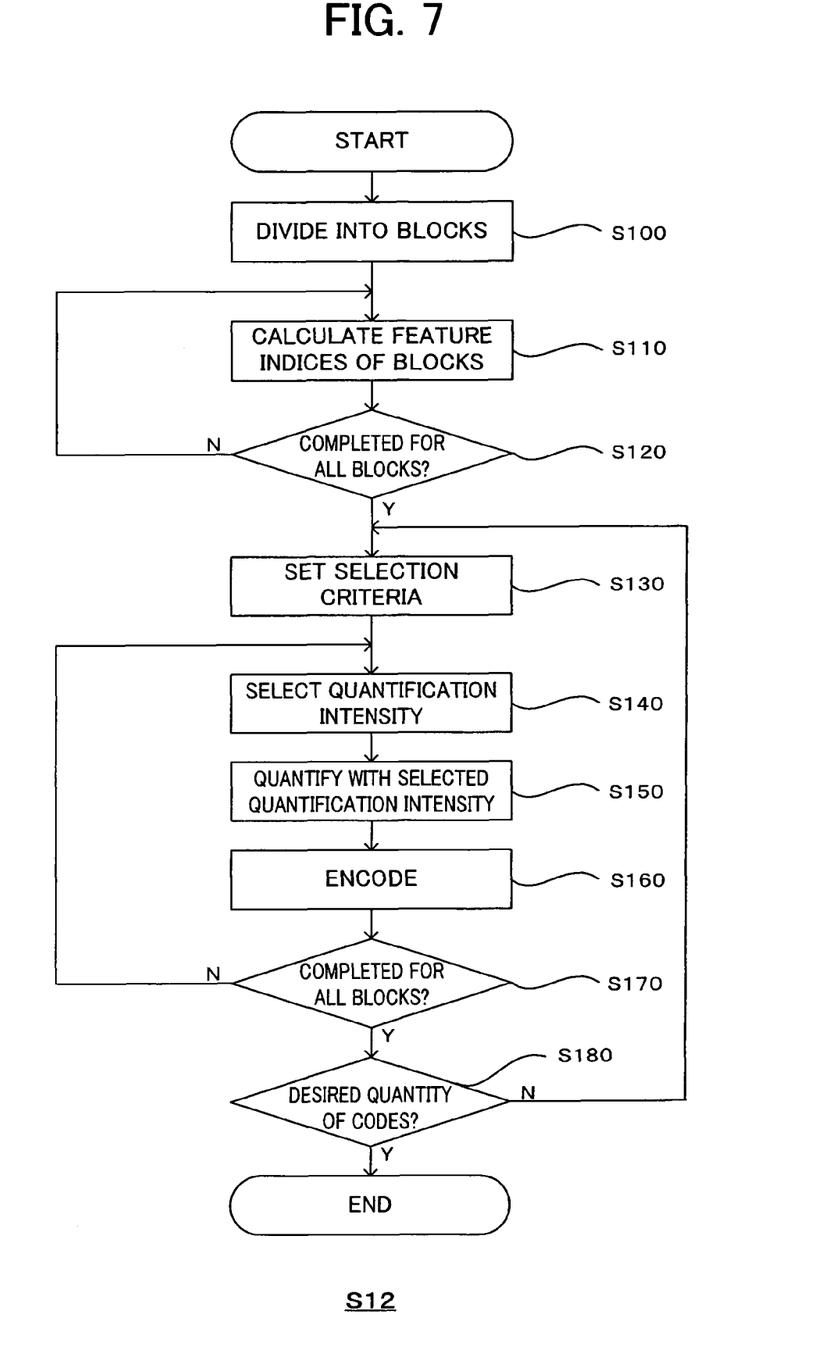
FIG. 7 is a flow chart of an operation (S12) of the image processing program 52 in a first modification.

FIG. 7 is a flow chart of an operation (S12) of the image processing program 52 in the first modification. In this chart, substantially the same steps of processing as their counterparts in the chart of FIG. 5 are assigned respectively the same reference signs.

As charted in FIG. 7, in this modification, feedback processing (S180) is added after the encoding of all the blocks is completed (Yes at S170).

At step 180 (S180), the controller 560 (FIG. 6) compares the quantity of codes of encoded data inputted from the encoder 550 with the target quantity of codes, and determines whether the quantity of codes of encoded data does not surpass the target quantity of codes.

The controller 560, if it determines that the quantity of codes of encoded data surpasses the target quantity of codes, calculates an actually measured value CL' on the basis of encoded data inputted from the encoder 550 (trial result), and instructs the selection criteria setter 520 to have the selection criterion reset with the calculated CL'. In this case, the image processing program 52 returns to the processing of S130, resets the selection criterion and processes quantization and encoding again.

Or the controller 560, if it determines that the quantity of codes of encoded data does not surpass the target quantity of codes, outputs the encoded data inputted from the encoder 550 as it is to the outside to complete the processing.

[Modification 2]

Next, a second modification will be described.

In the exemplary embodiment of the invention and the first modification described above, selection criteria are set after feature indices for all the blocks are calculated, and then quantization and encoding are processed, but where encoding is relatively light processing, encoding may as well be processed at the first trial.

In this connection, since the second modification has no feature index distribution which would give a hint in calculating selection criteria at the first trial, quantization and encoding are processed by utilizing prescribed default selection criteria and, if the target quantity of codes cannot be achieved the first trial, selection criteria are reset by using the feature indices calculated at the first trial.

The first attempt may as well be done by reversible encoding without quantization.

Figure 8:
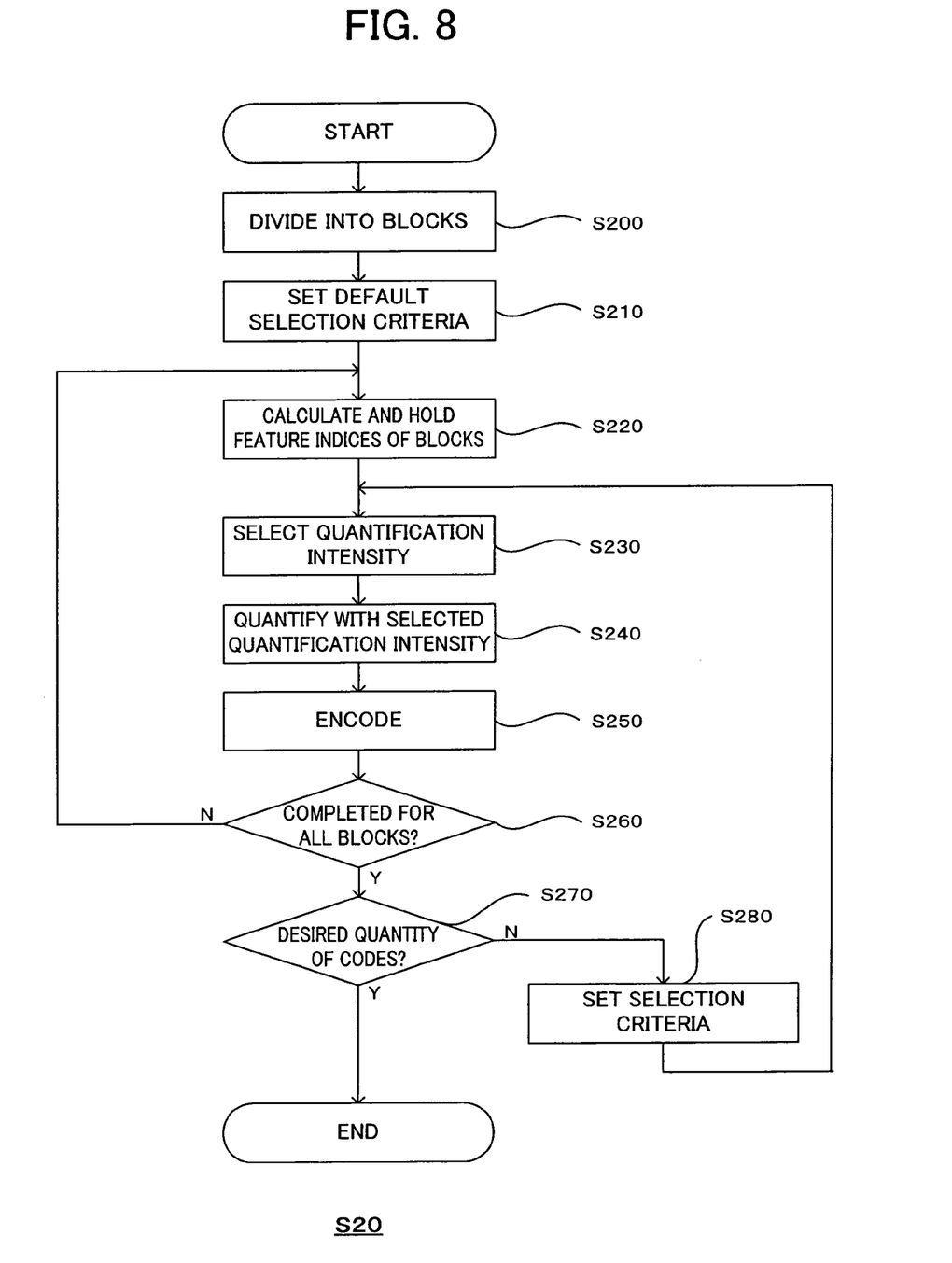
FIG. 8 is a flow chart of an operation (S20) of the image processing program 52 in a second modification.

FIG. 8 is a flow chart of an operation (S20) of the image processing program 52 in the second modification.

As charted in FIG. 8, when image data is inputted at step 200 (S200), the area setter 500 (FIG. 6) sets a block of a predetermined size for the inputted image.

At step 210 (S210), the selection criteria setter 520 sets default selection criteria.

At step 220 (S220), the feature index calculator 510 calculates the feature indices (dynamic ranges) of the blocks successively set by the area setter 500 (hereinafter referred to as noted blocks), and outputs the calculated feature indices to the selection criteria setter 520 and the intensity selector 530. The selection criteria setter 520 and the intensity selector 530 successively hold the feature indices inputted from the feature index calculator 510.

At step 230 (S230), the intensity selector 530 (FIG. 6) compares the feature indices (dynamic ranges) of the noted blocks with the selection criteria set by the selection criteria setter 520, and selects 2 as the upper limit of the number of tones if the dynamic range is not below the selection criterion or selects 1 as the upper limit of the number of tones if the dynamic range is below the selection criterion, and notifies the quantizer 540 of the selected upper limit of the number of tones.

At step 240 (S240), the quantizer 540 quantizes image information on the noted blocks according to the upper limit of the number of tones selected by the intensity selector 530.

At step 250 (S250), the encoder 550 encodes the image information on the noted blocks quantized by the quantizer 540.

At step 260 (S260), the image processing program 52 determines whether or not all the blocks have gone through encoding and, if there is any unprocessed block, returns to processing at S220 to process the next noted block or, if there is no unprocessed block, proceeds to processing at S270.

At step 270 (S270), the controller 560 (FIG. 6) compares the quantity of codes of the encoded data inputted from the encoder 550 with the target quantity of codes, and determines whether the quantity of codes of the encoded data is not greater than the target quantity of codes.

The controller 560, if it determines that the quantity of codes of encoded data surpasses the target quantity of codes, calculates an actually measured value CL' on the basis of encoded data inputted from the encoder 550 (trial result), and instructs the selection criteria setter 520 to have the selection criterion set with the calculated CL'.

Or the controller 560, if it determines that the quantity of codes of encoded data does not surpass the target quantity of codes, outputs the encoded data inputted from the encoder 550 as it is to the outside.

The image processing program 52, if it is determined that the quantity of codes of encoded data surpasses the target quantity of codes, proceeds to processing at S280 or, if it is determined that the quantity of codes of encoded data does not surpass the target quantity of codes, ends processing.

At step 280 (S280), the selection criteria setter 520 calculates selection criteria on the basis of the distribution of feature indices calculated by the feature index calculator 510 and the target quantity of codes, and outputs the calculated selection criteria to the intensity selector 530.

[Other Modifications]

Although the foregoing description of the exemplary embodiment and the modifications thereof supposes that the number of levels of quantization intensity is 2, if the number of levels of quantization intensity is greater than 2, it will become impossible to uniquely figure out the selection criteria because there is only one estimation formula of FIG. 3A while the freedom count of the selection criteria is greater than 2.

In such a case, some other constraint or constraints need to be added. Available constraints include, for instance, the arrangement of intervals among criteria (making them as nearly equal as possible, arranging them at an equal ratio, and so forth), the distribution of blocks covered by each criterion and restricting the number of blocks covered by rougher levels of quantization.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a feature index calculator configured to calculate feature indices of each partial image area of an inputted image;
    a criteria setter configured to set selection criteria based on the relation between the feature indices calculated by the feature index calculator and a cumulative number of partial image areas;
    an intensity selector configured to select, on the basis of the selection criteria set by the criteria setter, one of a plurality of quantization intensities for each partial image area of the inputted image;
    a quantizer configured to quantize image information on each partial image area with the quantization intensity selected by the intensity selector; and
    a processor programmed to control at least one of the feature index calculator, the criteria setter, the intensity selector and the quantizer,
    wherein the quantizer comprises:
        a one-tone grader configured to replace each pixel value of a plurality of pixel values for the partial image area with an average pixel value of the partial image area; and
        a two-tone grader configured to identify a maximum pixel value and a minimum pixel value of the partial image area, classify each of the pixel values in the partial image area having values above an average of the maximum pixel value and the minimum pixel value into a first group, classify each of the pixel values in the partial image area having values below the average of the maximum pixel value and the minimum pixel value into a second group, replace each pixel in the first group with an average pixel value of the first group, and replace each pixel in the second group with an average pixel value of the second group.

2. The image processing apparatus according to claim 1, wherein the intensity selector selects a quantization intensity for each partial image area on the basis of the selection criteria set by the criteria setter and the feature indices of each partial image area.

3. The image processing apparatus according to claim 2, further comprising:
    a feature index calculator configured to calculate the feature indices of each partial image area,
    wherein the criteria setter sets selection criteria on the basis of the distribution of the feature indices calculated by the feature index calculator; and
    the intensity selector selects a quantization intensity on the basis of the feature indices for each partial image area calculated by the feature index calculator and the selection criteria set by the criteria setter.

4. The image processing apparatus according to claim 1, wherein the criteria setter uses, as the feature index, the width of a range of tones contained in a partial image area.

5. The image processing apparatus according to claim 1, further comprising:
    an encoder configured to encode image information quantized by the quantizer; and
    a re-quantization determiner configured to decide to have an inputted image re-quantized when the quantity of codes of the image information encoded by the encoder exceeds an upper limit value,
    wherein the criteria setter updates the selection criteria when the re-quantization determiner decides to have re-quantization done.

6. The image processing apparatus according to claim 1, wherein the criteria setter sets the selection criteria based on a target quantity of codes and the relation between the feature indices calculated by the feature index calculator and the cumulative number of partial image areas.

7. The image processing apparatus according to claim 1, wherein the criteria setter sets as the selection criteria the feature index where the cumulative number of partial image areas is a target number of partial image areas calculated from target quantity of codes in the relation between the feature indices calculated by the feature index calculator and the cumulative number of partial image areas.

8. A non-transitory computer readable medium storing a program causing a computer to execute:
    calculating feature indices of each partial image area of an inputted image;
    setting selection criteria based on the relation between the feature indices calculated and a cumulative number of partial image areas;
    selecting, on the basis of the set selection criteria, one of a plurality of quantization intensities for each partial image area of the inputted image; and
    quantizing image information on each partial image area with the selected quantization intensity,
    wherein quantizing image information includes:
        one-tone grading that replaces each pixel value of a plurality of pixel values for the partial image area with an average pixel value of the partial image area, and
        a two-tone grading that identifies a maximum pixel value and a minimum pixel value of the partial image area, classifies each of the pixel values in the partial image area having values above an average of the maximum pixel value and the minimum pixel value into a first group, classifies each of the pixel values in the partial image area having values below the average of the maximum pixel value and the minimum pixel value into a second group, replaces each pixel in the first group with an average pixel value of the first group, and replaces each pixel in the second group with an average pixel value of the second group.

* * * * *